United States Patent
Verhaegen et al.

(10) Patent No.: US 9,256,678 B1
(45) Date of Patent: Feb. 9, 2016

(54) METHOD AND SYSTEM OF SIGNAL ANALYSIS BY USING METADATA

(75) Inventors: Gery Verhaegen, Vlaams Brabant (BE); Joeri Melis, Vlaams Brabant (BE); Peter J. Cain, Midlothian (GB)

(73) Assignee: Keysight Technologies, Inc., Santa Rosa, CA (US)

( * ) Notice: Subject to any disclaimer, the term of this patent is extended or adjusted under 35 U.S.C. 154(b) by 789 days.

(21) Appl. No.: 12/789,693

(22) Filed: May 28, 2010

(51) Int. Cl.
*G06F 7/00* (2006.01)
*G06F 17/30* (2006.01)
*G06F 19/00* (2011.01)

(52) U.S. Cl.
CPC ........ *G06F 17/30864* (2013.01); *G06F 19/321* (2013.01); *G06F 19/36* (2013.01)

(58) Field of Classification Search
CPC .. G06F 19/321; G06F 19/36; G06F 17/30864
USPC .......................................... 707/602; 702/127
See application file for complete search history.

(56) References Cited

U.S. PATENT DOCUMENTS

| | | | |
|---|---|---|---|
| 6,549,922 B1* | 4/2003 | Srivastava et al. | 1/1 |
| 6,651,059 B1* | 11/2003 | Sundaresan et al. | 1/1 |
| 7,266,771 B1 | 9/2007 | Tow et al. | |
| 2003/0163781 A1* | 8/2003 | Visharam et al. | 715/500 |
| 2005/0134707 A1* | 6/2005 | Perotti et al. | 348/239 |
| 2006/0235488 A1* | 10/2006 | Nycz et al. | 607/60 |
| 2007/0179739 A1* | 8/2007 | Donofrio et al. | 702/160 |
| 2007/0299945 A1* | 12/2007 | Lunsford | 709/223 |
| 2008/0181465 A1* | 7/2008 | Sauerwein | 382/115 |
| 2009/0112864 A1* | 4/2009 | Raichelgauz et al. | 707/6 |
| 2010/0100734 A1* | 4/2010 | Chastel | 713/168 |
| 2011/0222746 A1* | 9/2011 | Kotula et al. | 382/128 |

* cited by examiner

*Primary Examiner* — Cheyne D Ly

(57) ABSTRACT

A system for analyzing data, such as data representing samples of a received wireless signal, includes a memory controller for storing the data in one or more memory devices, a metadata extractor for extracting metadata in real-time from the data as it is being processed for storage, and one or more processors for analyzing the metadata to identify portions of the stored data having a characteristic of interest, and for processing the identified portions of the stored data.

17 Claims, 6 Drawing Sheets

METHOD AND SYSTEM OF SIGNAL ANALYSIS BY USING METADATA

BACKGROUND

As wireless communication systems are deployed, there is a need to be able to capture or make measurements of wireless communication signals at various locations to identify and diagnose communication problems, which may be location-dependent, and to identify when additional communication resources need to be deployed to serve a particular area.

FIG. 1 illustrates a process 100 of measuring a signal of interest and analyzing the measurement data. In the example of FIG. 1, the signal of interest may be a radio frequency (RF) signal of a wireless communication system.

In a step 110 a user provides the settings that will be used, for example by a measurement instrument, to measure the signal of interest.

In a step 120, the user starts the measurements, for example by providing the signal of interest to the measurement instrument and instructing the measurement instrument to begin capturing, or making measurements of, the signal of interest. From this point, the signal of interest is captured (e.g., digitally sampled) and measurement data representing the received signal of interest is recorded as time elapses. Typically, the signal of interest is captured for a particular length or time period.

In a step 130, the measurement data from the signal of interest is stored to a file or array in a memory device for subsequent processing.

In step 140, the measurement data representing the received signal is transferred from a storage device or memory to a processor which processes the measurement data "off-line" or in non-real-time according to a desired algorithm whose parameters may be provided by the user in step 110. In some embodiments, processing the measurement data may include detecting a power level of the received signal as a function of time. In some embodiments, processing the measurement data may include demodulating the received signal and converting it to a set of baseband data.

In a step 150, the processed data is sorted and displayed to a user.

Long captures of wireless communication signals can produce a lot of data. For example, a one minute recording of a 20 MHz wide Long Term Evolution (LTE) wireless signal may produce 7 GB of data. Traditionally one needs to analyze all of this measurement data to find where a problem exists. However, analyzing this amount of data can take a prohibitively long time.

In order to avoid having to analyze such large amount of data, a trigger may be employed to try to capture only the data of interest. However, setting up the right trigger condition(s) is hard and time consuming, especially where the user does not have the a priori information needed to configure the trigger function. In some situations, a user may view a time-domain representation of a signal on an oscilloscope, and adjust the trigger accordingly. However, the time-domain representation of modern wireless signals, such as orthogonal frequency domain modulated (OFDM) signals, is often too complex for visual interpretation and may not reveal the information that is needed or desired.

What is needed, therefore, is a system and method for efficiently processing and analyzing large amounts of measurement data.

SUMMARY

In an example embodiment, a system comprises: an integrated circuit device, comprising, at least one metadata extractor for extracting metadata in real-time from data representing samples of a received wireless signal, and a memory controller for storing the data to one or more memory devices; and one or more processors for analyzing the metadata to identify portions of the stored data having one or more characteristics of interest, for selecting portions of the stored data having the one or more characteristics of interest, and for processing the selected portions of the stored data having the one or more characteristics of interest to generate processed data.

In another example embodiment, a device comprises: at least one metadata extractor for extracting metadata in real-time from data representing samples of a received wireless signal; a memory controller for storing the data and the metadata to one or more memory devices; and a data bus for providing the metadata to a first processor for analyzing the metadata to identify portions of the stored data having one or more characteristics of interest, and for providing to a second processor the portions of the stored data having the one or more characteristics of interest.

In yet another example embodiment, a method comprises: extracting metadata in real-time from data representing samples of a received wireless signal; storing the data in a memory device; analyzing the metadata to identify portions of the data having one or more characteristics of interest; selecting the portions of the stored data having the one or more characteristics of interest; and processing the selected portions of the stored data having the one or more characteristics of interest to generate processed data.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
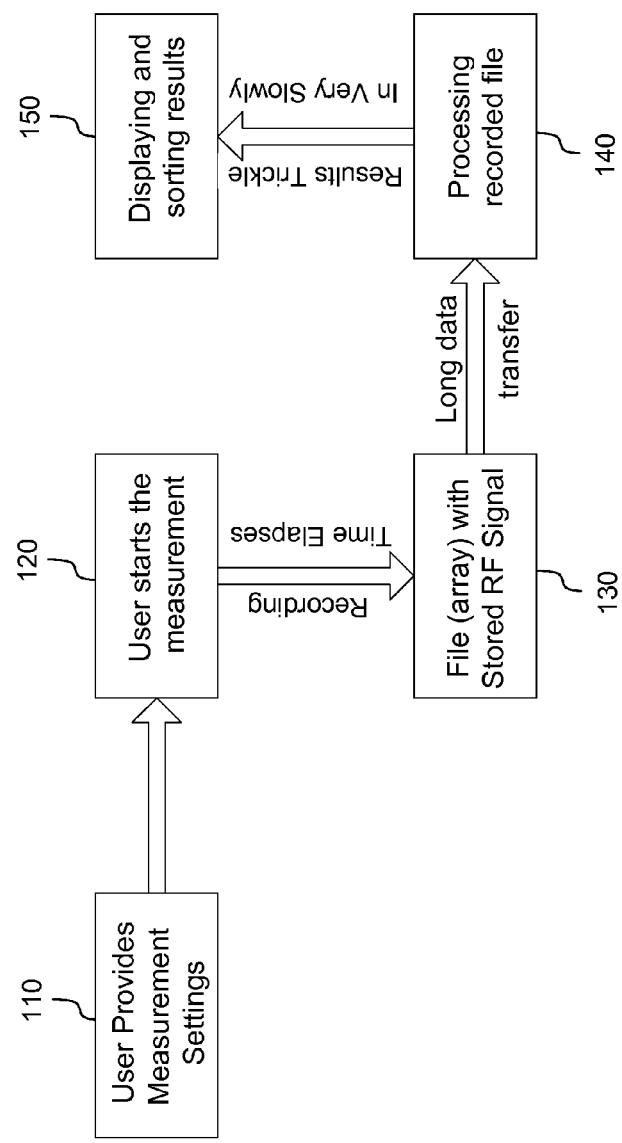
FIG. 1 illustrates a process of measuring a signal and analyzing the measurement data.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Unless otherwise noted, when a first device is said to be connected to a second device, this encompasses cases where one or more intermediate devices may be employed to connect the two devices to each other. However, when a first device is said to be directly connected to a second device, this encompasses only cases where the two devices are connected to each other without any intermediate or intervening devices. Similarly, when a signal is said to be coupled to a device, this encompasses cases where one or more intermediate devices may be employed to couple the signal to the device. However, when a signal is said to be directly coupled to a device, this encompasses only cases where the signal is directly coupled to the device without any intermediate or intervening devices.

As used herein, the term "metadata" is understood to mean a set of data that describes one or more characteristics of some other set of data. So, for example, metadata for a set of measured data cannot comprise just the set of measured data itself, or even just a subset of the measured data, but instead is a separate set of data that describes one of more characteristics of the measured data. For example, in a case where the measured data comprises samples of a received time-varying RF waveform, metadata may include data that describes the average amplitude of the received RF waveform over some defined time interval as a function of time (e.g., average amplitude values in each 1 millisecond interval), or peak values of the received RF waveform over some defined time interval as a function of time (e.g., peak amplitude values in each 1 millisecond interval), or some other characteristic(s) of the received RF waveform. Here the "characteristic" of the data that is described by the metadata may be intrinsic, such as a statistical characteristic as described above, or may be extrinsic, such as a characteristic describing an environment or condition under which the data was produced or obtained or is valid, a source of the data, etc. Examples could include a measurement time, a location where the data was obtained, an analog gain of a receiver that received or processed the data, etc.

As used herein, the term "extracting metadata in real-time" from a set of data is understood to mean extraction of metadata from the data as the data itself is being acquired or captured and stored to memory. This would be contrasted with "off-line extraction of metadata" from a set of data wherein the set of data is first captured and stored to memory, and then the stored data set is retrieved and processed to produce the metadata.

Figure 2:
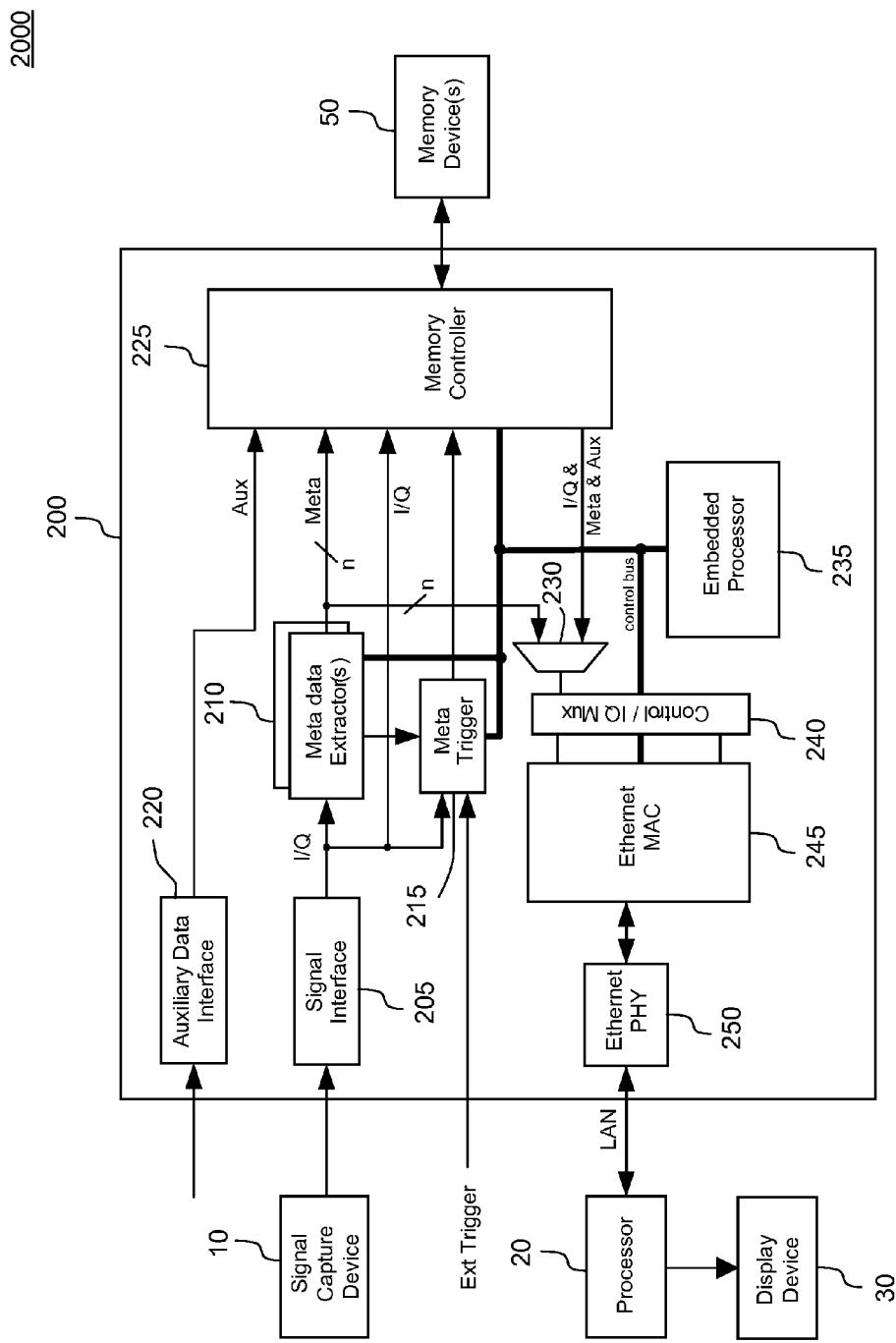
FIG. 2 illustrates one embodiment of a system including one embodiment of a metadata extraction and analysis system.

FIG. 2 illustrates one example embodiment of a system 2000 including one embodiment of a metadata extraction and analysis device 200 (hereinafter device 200). Metadata extraction and analysis device 200 includes a signal interface 205, one or more metadata extractors 210, a trigger device 215, auxiliary data interface 220, a memory controller 225, a first multiplexer 230, an embedded processor 235, a second multiplexer 240, an Ethernet media access controller (MAC) 245, and an Ethernet Physical Layer interface 250.

In one embodiment, device 200 comprises a field programmable gate array (FPGA) which interfaces to a signal capture device 10, generates real-time metadata, controls one or more memory devices (e.g., one or more solid state disks) 50 and interfaces via a local area network (LAN) to a signal processor 20, which may include signal analysis software which may run on one or more processors (e.g., a user's personal computer) and which may drive a display device 30.

Illustrative but non-limiting examples of operation of system 2000 will now be described with respect to an example embodiment where signal capture device 10 is an RF signal analyzer that receives a signal (e.g., a wireless RF/microwave signal from a wireless communication system) and generates data (e.g., I/Q data) representing samples of the received wireless signal and wherein system 2000 processes the I/Q data from the RF signal analyzer to try to identify and analyze problems that might exist in a wireless communication system employing the wireless signal.

In that case, signal interface 205 receives the I/Q data and provides it to metadata extractor(s) 210 and trigger device 215.

The I/Q data is written via memory controller 225 to memory device(s) 50. In some embodiments, the I/Q data is written to memory device(s) 50 as if memory device(s) 50 were a circular buffer: when reaching the end of the storage the beginning of the recording is overwritten. This may be comparable to the operation of the acquisition memory on digital oscilloscopes.

In some embodiments, the I/Q data is time stamped (e.g., by signal capture device 10) and is stored into memory device(s) 50 with the corresponding time stamps.

In some embodiments, auxiliary data may be received by auxiliary data interface 220 and stored in memory device(s) 50. Auxiliary data may include valuable information available inside (or outside) signal capture device 10 which should be recorded. In some embodiments, this auxiliary data can be supplied to one or more of the metadata extractor(s) 210 along with the I/Q data to help create useful insight into the I/Q data. In some embodiments, auxiliary data interface 220 may be omitted.

Metadata extractor(s) 210 extract metadata in real-time from the I/Q data via programmable hardware during the process of writing the I/Q data to memory device(s) 50. In one embodiment, parameters of metadata extractor(s) 210 may be programmed or changed by a user through signal processor 20 (e.g., via a user interface) and sent as commands via the LAN connection to Ethernet Physical Layer interface 250 and thereby to embedded processor 235 which initializes computation block(s) of metadata extractor(s) 210 accordingly.

In some embodiments, the data is grouped into blocks or frames (e.g., one block may equal one millisecond of data) and metadata extractor(s) 210 extract metadata corresponding to each block or frame of I/Q data.

The generated metadata is written via memory controller 225 to memory device(s) 50. In some embodiments, the metadata is time stamped with the same timestamps as the corresponding portions of the I/Q data from which it was extracted, and is stored into memory device(s) 50 with the corresponding time stamps.

In comparison to the stored I/Q data, in general the metadata occupies a small fraction of memory device(s) 50. In some embodiments, the metadata is written to memory device(s) 50 as a separate circular buffer from the I/Q data from which it was generated. In some embodiments, the stored I/Q data and the stored metadata are linked through the timestamps. Smaller recording lengths are possible allowing for multiple data captures. In that case, each recording could be treated as a circular buffer with a predefined length, and with the full disk-size recording then being a special case.

In some embodiments, multiple metadata extractor(s) 210 operate on the I/Q data in parallel, each of them building a different piece of information regarding the I/Q data.

One property of a wireless signal that may be monitored is its power, integrated or averaged over a number of samples. Accordingly, in one embodiment, metadata extractor(s) 210 extracts a power of the data, integrated or averaged over a number of data samples. The time resolution of the metadata extraction should be high enough to reveal activity of interest in the wireless signal. For example, in the case of OFDM signals like LTE, integrating over a fraction of the symbol duration may be adequate, and in that case in some embodiments the amount of metadata produced may be less than the amount of the original data by a factor between 50 and 1000 depending on the signal bandwidth. In some embodiments, even higher reductions such as a fraction of the frame duration are possible at the cost of a lesser resolution to signal changes.

Examples of other signal properties that may be extracted as metadata in various embodiments of system 2000 include signal statistics such as variance, kurtosis, probability distribution, etc. Beneficially, the metadata extraction algorithms are simple enough to be implemented in hardware (FPGA gates) and/or as real-time embedded software in device 200.

In some embodiments, device 200 stores into memory device(s) 50 a stream of metadata that gives a summarized picture of the I/Q data. In some embodiments, limiting factors might be the real-time recording bandwidth of memory device(s) 50 and the available resources in device 200 to implement the algorithms.

Under the control of embedded processor 235, I/Q data and metadata stored in memory device(s) 50 can be provided by device 200 to signal processor 20 for analysis and processing.

In general the metadata set is smaller than the entire stored set of I/Q data from the wireless signal. Therefore, the metadata set can be transferred via data bus 255 to a processor (e.g., signal processor 20) and processed more quickly than the stored I/Q data set, so as to identify the portion(s) of the I/Q data set that have some characteristic of interest that suggests further processing would be beneficial. By retrieving and processing the metadata first, signal processor 20 can reorder the stored I/Q data set for reading and processing depending on the expected likeliness of finding the small parts of the I/Q data set that are likely to be of interest to a user.

For example, in some embodiments device 200 provides metadata to signal processor 20 which analyzes the metadata to identify portions of the stored I/Q data having one or more characteristics of interest. In some embodiments, the characteristic(s) of interest may be specified by a user of signal processor 20, for example via a graphical user interface. In some embodiments, signal processor 20 may compare the metadata to one or more selection criteria for selecting portions of the stored I/Q data having the one or more characteristics of interest. As an illustrative example, in one embodiment the extracted metadata may include a power level (e.g., averaged or integrated over a block or frame of data) of the I/Q signal, one characteristic of interest in the I/Q data may be an elevated power level, and the selection criteria may be that the power level of the I/Q data exceeds a certain threshold. Other characteristics may pertain to the variance, kurtosis, or a probability distribution feature of the I/Q data.

In some embodiments, metadata may be provided in real-time from device 200 to signal processor 20 and thereby to display device 30 as the I/Q data is captured and stored in memory device(s) 50. In that case, a user may be able to inspect the metadata and perform a quick visual check first to verify that the data recording proceeds without issues such as unintended interference.

Signal processor 20 can process the selected portions of the stored I/Q data having the one or more characteristics of interest to generate processed data. In some embodiments, signal processor 20 may process the stored I/Q data to produce digital data communicated by the wireless signal, for example according to a known format of the wireless signal (e.g., demodulation, de-interleaving, error correction decoding, etc.).

In some embodiments, signal processor 20 can randomly access the stored I/Q data to at least a certain minimal block size by means of memory access requests communicated to memory controller 225 via the LAN connection to Ethernet Physical Layer interface 250.

Some embodiments can also compute and record signal properties taking advantage of a priori knowledge. For example, in global system for mobile communications (GSM) the negotiation between base station and mobile for instance, happens in a defined band. Each mobile user could be restricted to a particular band. By measuring only the power in these bands one can isolate the activity between the base station and a particular mobile user.

In some embodiments, embedded processor 235 of device 200 may perform the metadata analysis as described above, and provide the analysis results to signal processor 20 to drive processing of the I/Q data.

In various embodiments, the metadata extraction algorithm(s) executed by metadata extractor(s) 210 can be modified in several ways, for example in response to a user selection or command which may be communicated via a user interface of signal processor 20 and then provided to device 200 via Ethernet Physical Layer interface 250. In some embodiments, device 200 can be reconfigured by downloading new configuration data where only the extraction algorithm(s) are different. Depending on the actual implementation this may mean that the entire device 200 may be reprogrammed, or that only parts of its content are dynamically swapped, be it in the form of logic or memory content. In some embodiments, memory device(s) 50 (e.g., solid state disk(s)) could be used as non-volatile storage for instrument state variables during reconfiguration of device 200.

In some embodiments, device 200 could be configured to allow additional metadata, besides that which is generated in real-time and stored with the I/Q data, to be computed after the I/Q data is stored. However, in general, this is sub-optimal since in this case the stored I/Q data must be read from memory device(s) 50 and passed through metadata extractor(s) 210. This can still provide a benefit with respect to the analysis in signal processor 20, because the metadata computation happens in the hardware device 200 and only the result(s) need to be transferred to, and analyzed by signal processor 20. One can consider this as hardware-assisted analysis. In-depth analysis of the I/Q data can then follow as in the case of real-time metadata generation. If the read-speed from memory device(s) 50 is higher than the I/Q data rate, then such off-line metadata generation can still provide some additional analysis speed gain. However, in some embodiments one or more benefits accrue from extracting the metadata in real-time from the I/Q data.

Once a user of system 2000 has identified a problem in a communication system that is being analyzed, because the metadata is extracted in real-time, further automation is possible by means of trigger device 215, allowing the user to trigger the storing of I/Q data into memory device(s) 50 in response to metadata extractor(s) 210 identifying the data as having one or more characteristics of interest. That is, trigger device 215 may receive a control signal from one or more metadata extractors 210 to start and/or stop the storing of the I/Q data by memory controller 225 in memory device(s) 50 when the metadata indicates that the I/Q data has one or more characteristics of interest which may indicate a data region where a problem that is being analyzed can be observed. For example, the metadata extractor may identify portions of the I/Q data where the power level exceeds some threshold, thereby excluding time periods where the wireless signal is not being transmitted and which only contain noise. By triggering the storing of the I/Q data in response to metadata that suggests that a particular problem may be observed, data pertaining to the actual underlying problem is now very likely to be present in the stored I/Q data.

This can reduce the amount of I/Q data that needs to be analyzed in order to find the area of interest where the problem occurred. The benefits of such data reduction can be substantial when the volume of data is large, such as when storing I/Q data of a received wireless signal.

Figure 3C:
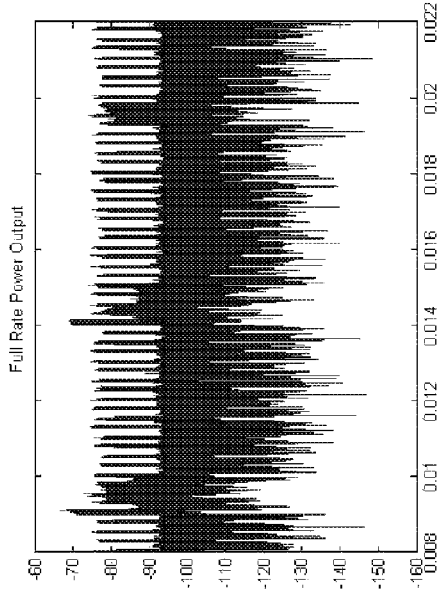
FIGS. 3A-3C show various graphs for an example set of measured data.
Figure 3D:
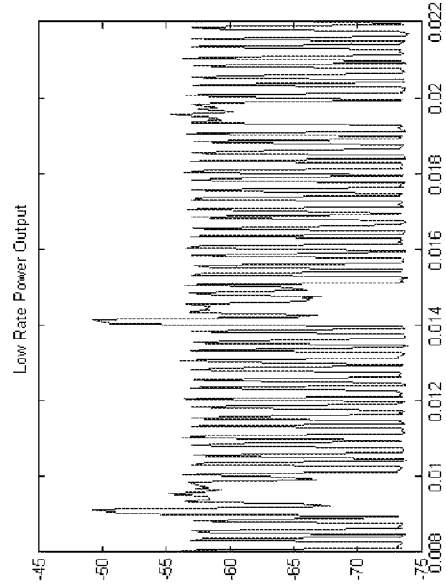
FIG. 3D shows a graph of an example set of metadata describing a characteristic of the example set of measured data from FIGS. 3A-C.
Figure 3A:
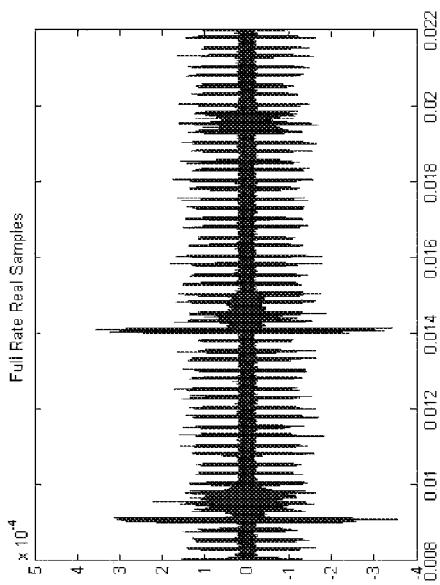
Figure 3B:
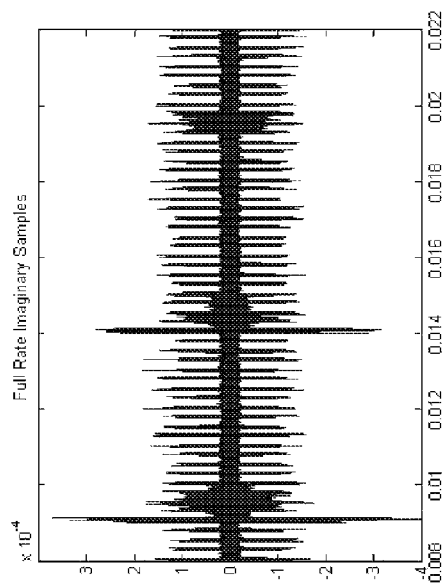

For example, FIGS. 3A-3C show various graphs for an example set of measured data representing a wireless signal, and FIG. 3D shows a graph of an example set of metadata describing a characteristic of the example set of measured data of FIGS. 3A-C.

In particular, FIGS. 3A-B illustrate I and Q samples of a received wireless signal versus time, and FIG. 3C illustrates the power of the received wireless signal. FIG. 3D shows an example of metadata representing the integrated power of the received wireless signal versus time. The signal illustrated with respect to FIGS. 3A-D was sampled at 12.8 Msamples/second (complex) and the power integration period was chosen to be 40 us or 512 samples of the original signal. Considering that the input signal is complex and includes I and Q components, the metadata is reduced by a factor of 1024 compared to the original data samples. The resulting data rate is 25 k power samples per second. It is apparent that the real-time generated metadata power measurements will be faster to display and analyze than the original data because the amount of data and the update rate have been vastly reduced.

In a typical current measurement system that lacks the metadata capabilities described above, a set of measured data is processed from the start of a file to the end of the file, calculating the detailed measurement results for each section as it proceeds. However, this can be quite time-consuming in cases where the volume of data is large, as described above.

Even if, due to its limited precision and granularity, the metadata may not be capable of showing exactly where the interesting measurement regions can be found, it may often still correlate somewhat, allowing some parts of a data recording to be filtered out as being unlikely to contain data of interest. For example, the metadata may be precise enough to indicate periods in which only thermal noise rather than emissions of a wireless signal from a device or system under test were captured. The time that otherwise would have been spent analyzing these parts of the data set can thus be gained by using the metadata to inform the data analysis.

Even where actually completely filtering out parts of the stored data isn't possible, in some embodiments the data may be reordered or prioritized for analysis. For instance if it is noticed that data frames with a higher than usual peak to average ratio are correlated with a certain system problem or problems, peak to average metadata could be obtained and the recorded data file could reordered for analysis in by descending peak to average rate rather than by ascending capture time. This means that the part with an abnormality is more like to be analyzed sooner compared to an unordered analysis. The amount of time saving will greatly depend on how well the target area in the capture can be filtered from the other messages by using nothing but the stored metadata. In some cases, this gain could be huge and relatively easy to obtain. Additionally, often the user will only be interested in the first x occurrences of the issue under investigation. If the results should arrive in a pre-sorted order, the average time needed to accumulate these first x occurrences may be much smaller than if the data was analyzed sequentially.

Figure 4:
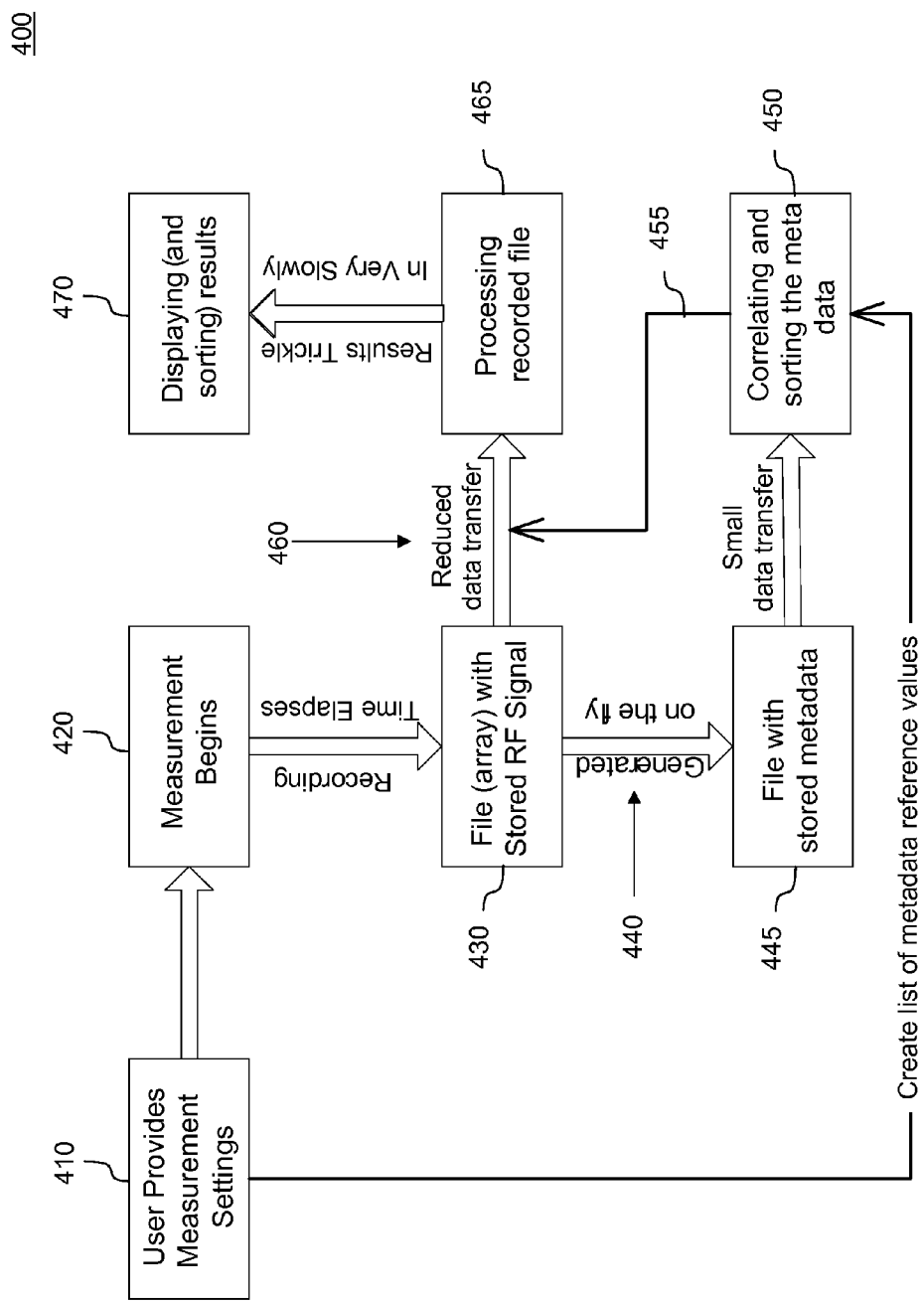
FIG. 4 illustrates one embodiment of a process that employs metadata in the analysis of data.

FIG. 4 illustrates one embodiment of a process 400 that employs metadata in the analysis of a set of captured data.

In a step 410 a user supplies to a system settings to be used. These settings may be supplied via a user interface of a processor based analysis system (e.g., software executing on a user's personal computer), and may include one or more reference values for the metadata and one or more correlation thresholds for the metadata, as will be explained below. In some embodiments, some or all of the reference value(s) and/or threshold value(s) may be generated automatically by the processor.

In a step 420, a measurement begins by capturing a data stream of interest, for example by receiving and sampling a wireless RF signal.

In a step 430, the data is stored in a file or array in one or more memory devices.

In a step 440, metadata is extracted in real-time from the data stream while the data is being captured and in step 445 the metadata is stored in the memory device(s).

In a step 450, some or all of the metadata is retrieved and correlated with the one or more reference values to obtain correlation values for the metadata. For example, the data may be grouped into blocks or frames and a metadata value (e.g., integrated power level) may be provided for each block or frame of data.

In step 460, the stored data is transferred to a processor for analysis based on the metadata correlation and sorting results. In some embodiments, portions of the stored data are selected at step 455 for processing in order according to the correlation results from step 450, beginning with those portions of the stored data wherein the corresponding metadata has a highest correlation with the reference value(s), and ending with those portions of the stored data wherein the corresponding metadata has a lowest correlation with the reference values.

In step 465, the transferred data is processed in the selected order.

In a step 470, the processed data is displayed to a user via a display device. In some embodiments, the processed data is displayed not in sequential order, but rather in an order from those selected portions of the stored data wherein the corresponding metadata has the highest correlation with the reference value(s), to those selected portions of the stored data wherein the corresponding metadata has the lowest correlation with the reference value(s).

Figure 5:
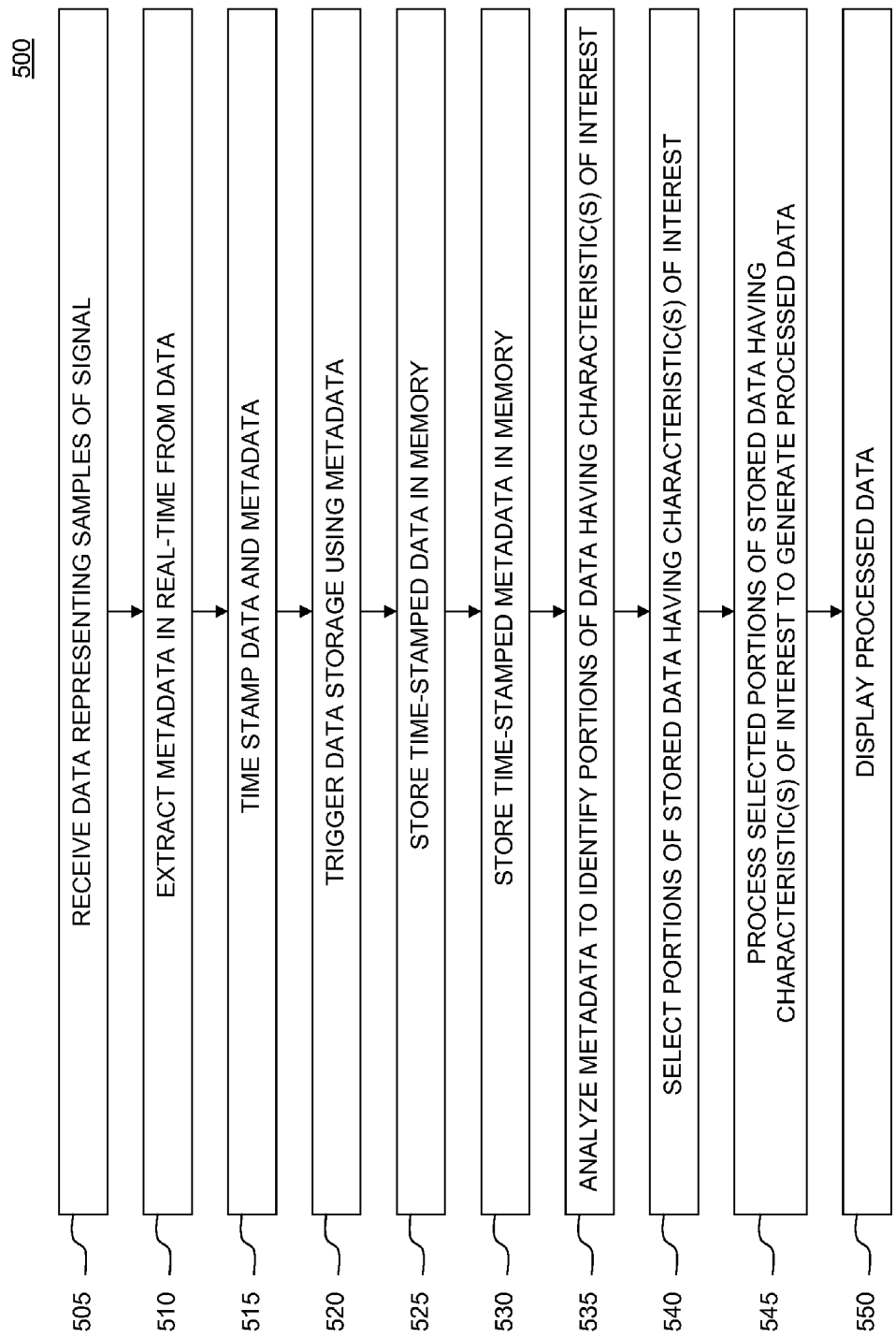
FIG. 5 illustrates one embodiment of a flowchart of a method of analyzing data.

FIG. 5 illustrates one embodiment of a flowchart of a method 500 of analyzing data using one or more principles discussed above.

In a step 505 data representing samples of a signal to be analyzed are obtained or received.

In a step 510 metadata is extracted in real-time from the data.

In a step 515 the data and metadata are time stamped. In some other embodiments, the data may already be time stamped when it is obtained or received in step 505.

In a step 520 the metadata is used to set one or more triggers for beginning and/or ending storage of the time-stamped data. In some other embodiments, the step 520 of triggering on the metadata may be omitted.

In a step 525 the time-stamped data is stored in one or more memory devices.

In a step 530 the time-stamped metadata is stored in the one or more memory devices.

In a step 535 the metadata is analyzed to identify portions of the data having one or more characteristics of interest.

In a step 540 portions (e.g., blocks or frames) of the stored data having the one or more characteristics of interest are selected. In some embodiments, the portions are selected not in a chronological order, but in an order according to how correlated each portion is to the characteristic(s) of interest: the portion of the stored data most correlated to the characteristic(s) of interest is selected first, then the portion of the data that is second-most correlated to the characteristic(s) of interest is selected next, etc.

In a step 545 portions of the stored data are processed for further analysis according to the order in which they were selected in step 540.

In a step 550 the processed data is displayed to a user.

Numerous variations of the steps shown in FIG. 5 are possible, including the order in which the steps are performed.

Figure 6:
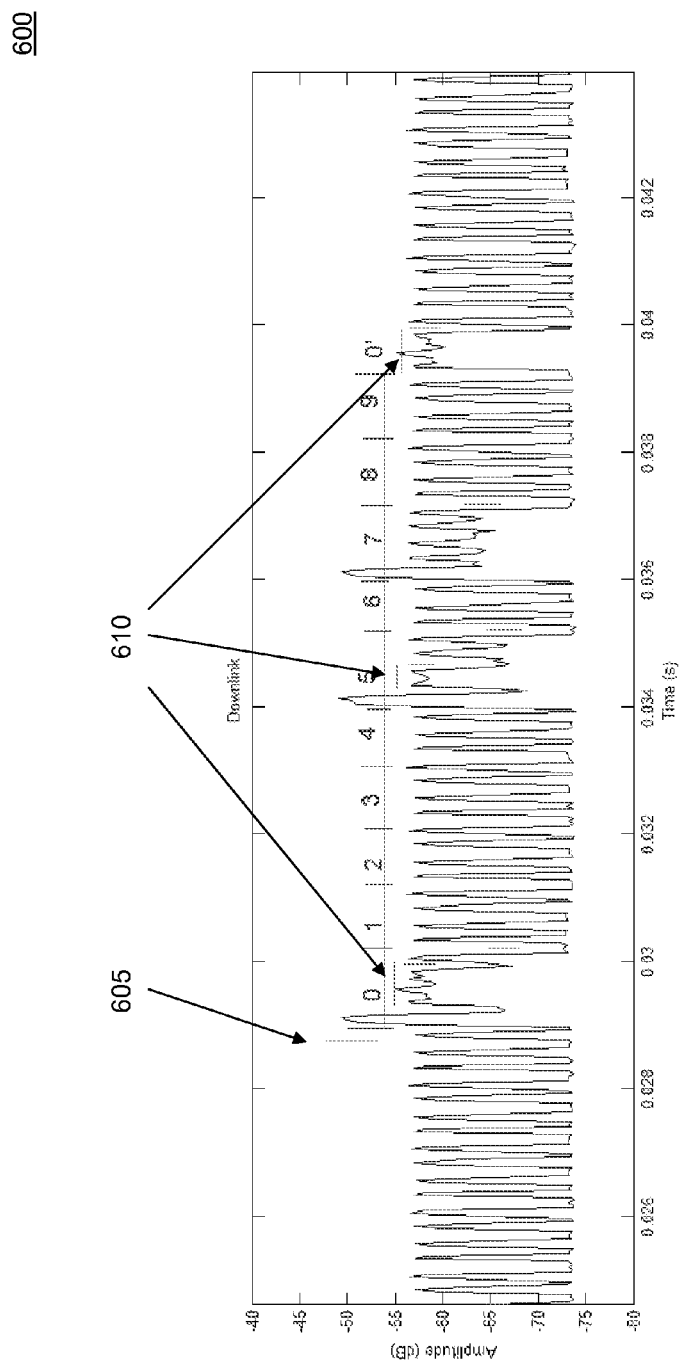
FIG. 6 is a graph of an example set of metadata.

FIG. 6 is a graph 600 of an example set of metadata for illustrating one or more possible benefits of employing metadata analysis for informing an analysis of a larger data set.

The lines 605 and 610 show trigger levels for time and power intervals, respectively. FIG. 6 demonstrates than even with the metadata's rather vague and noisy pattern, and with a simplistic way of determining correlation between the data and an event of interest, it is still quite possible to derive useful information to reduce the data and/or to rearrange the order of processing to improve a user's experience in certain cases.

For example, consider a case where the user notices an occasional error with small protocol messages over a shared communication channel but can't pinpoint it any further. In that case, he would like to configure the measurement system up to run as little as possible besides recording these small protocol messages. In this case a processor that analyzes the metadata finds out that in the section displayed in FIG. 6 (which shows about 20 ms) only the sub-frames named 0, 5 and 7 are useful. It also shows that sub-frame 7 carries about twice as much data than the other sub-frames. This could signal two small packets in this case bringing the total amount of messages in our section to 4.

As such the full data analysis is done first on sub-frame 7 and then on sub-frames 0 and 5. This allows the complete range of target messages to be analyzed about 20/3 times faster. Even better is that if the fault can be in any of the packets in our section the first analysis of sub-frame 7 already has a 50% of finding the issue. So if we assume a fixed time for every sub-frame analysis the use of metadata allows us to speed up this search between 6.7 and 20 times and we have an average speed up of about 15 times.

While example embodiments are disclosed herein, one of ordinary skill in the art appreciates that many variations that are in accordance with the present teachings are possible and remain within the scope of the appended claims. Such variations are in accordance with the present teachings and remain within the scope of the appended claims. The invention therefore is not to be restricted except within the scope of the appended claims.

The invention claimed is:

1. A system, comprising:
   an integrated circuit device, comprising
      at least one metadata extractor for extracting metadata in real-time from data representing samples of a signal received wirelessly, the metadata descriptive of one or more signal properties of the received wireless signal, and
      a memory controller for storing the data representing samples to one or more memory devices,
      the at least one metadata extractor extracting the metadata during storing of the data representing samples by the memory controller; and
   one or more processors for analyzing the metadata to identify portions of the stored data having one or more signal properties of interest, for selecting portions of the stored data having the one or more signal properties of interest, and for processing the selected portions of the stored data having the one or more signal properties of interest to generate processed data,
   wherein the one or more signal properties comprises power of the received wireless signal, and
   wherein the one or more processors compare the metadata with one or more selection criteria and select as the selected portions the stored data corresponding to metadata where a comparison value obtained from the comparison exceeds a threshold.

2. The system of claim 1, wherein the memory controller stores in the one or more memory devices time stamps associated with the stored data, and wherein the one or more processors identify those portions of the stored data having the one or more signal properties of interest by reference to the time stamps.

3. The system of claim 1, wherein the one or more processors comprise:
   a first processor in the integrated circuit device configured to analyze the metadata to identify portions of the stored data having the one or more signal properties of interest; and
   a second processor external to the integrated circuit device configured to process the selected portions of the stored data having the one or more signal properties of interest to generate processed data.

4. The system of claim 1, wherein the second processor first processes those selected portions of the stored data wherein the corresponding metadata has a highest comparison value, and subsequently processes those selected portions of the stored data wherein the corresponding metadata has a lowest comparison value.

5. A device, comprising:
   at least one metadata extractor for extracting metadata in real-time from data representing samples of a signal received wirelessly, the metadata descriptive of one or more signal properties of the received wireless signal;
   a memory controller for storing the data representing samples and the metadata to one or more memory devices;
   a data bus for providing the metadata to a first processor for analyzing the metadata to identify portions of the stored data having one or more signal properties of interest, and for providing to a second processor the portions of the stored data having the one or more signal properties of interest,
   wherein the one or more signal properties comprises power of the received wireless signal; and
   a trigger device configured to trigger the memory controller to start and/or stop the storing of the data representing samples to the one or more memory devices in response to the metadata identifying a portion of the data representing samples as having the one or more signal properties of interest.

6. The device of claim 5, wherein the device is embodied in an integrated circuit device.

7. The device of claim 6, wherein the at least one metadata extractor is configurable via control data provided to the device via an interface to change at least one metadata extraction algorithm employed by the at least one metadata extractor so as to change a type of metadata extracted by the at least one metadata extractor.

8. A device, comprising:
at least one metadata extractor for extracting metadata in real-time from data representing samples of a signal received wirelessly, the metadata descriptive of one or more signal properties of the received wireless signal;
a memory controller for storing the data representing samples and the metadata to one or more memory devices; and
a data bus for providing the metadata to a first processor for analyzing the metadata to identify portions of the stored data having one or more signal properties of interest, and for providing to a second processor the portions of the stored data having the one or more signal properties of interest,
wherein the one or more signal properties comprises power of the received wireless signal, and
wherein the at least one metadata extractor extracts an average power level of the received wireless signal as the metadata, and wherein the one or more signal properties of interest includes the average power level of the received wireless signal being above a threshold.

9. The device of claim 8, wherein the first and second processors are a same processor.

10. A method, comprising:
extracting metadata in real-time from data representing samples of a signal received wirelessly, the metadata descriptive of one or more signal properties of the received wireless signal;
storing the data representing samples in one or more memory devices;
analyzing the metadata to identify portions of the stored data having one or more signal properties of interest;
selecting the portions of the stored data having the one or more signal properties of interest; and
processing the selected portions of the stored data having the one or more signal properties of interest to generate processed data,
wherein the one or more signal properties comprises power of the received wireless signal, and
wherein said extracting comprises extracting an average power level of the received wireless signal as the metadata, wherein the one or more signal properties of interest include the average power level of the received wireless signal being above a threshold.

11. A method, further comprising:
extracting metadata in real-time from data representing samples of a signal received wirelessly, the metadata descriptive of one or more signal properties of the received wireless signal;
storing the data representing samples in one or more memory devices;
analyzing the metadata to identify portions of the stored data having one or more signal properties of interest;
selecting the portions of the stored data having the one or more signal properties of interest; and
processing the selected portions of the stored data having the one or more signal properties of interest to generate processed data,
wherein the one or more signal properties comprises power of the received wireless signal, and
wherein said selecting comprises comparing the metadata with at least one selection criteria and selecting as the selected portions the stored data corresponding to metadata where a comparison value obtained from the comparison exceeds a threshold.

12. The method of claim 11, further comprising starting and/or stopping the storing of the data representing samples to the one or more memory devices in response to the metadata identifying a portion of the data representing samples as having the one or more signal properties of interest.

13. The method of claim 11, wherein said processing comprises processing the selected portions of the stored data in order according to the comparison values thereof, beginning with those portions of the stored data wherein the corresponding metadata has a highest comparison value, and ending with those selected portions of the stored data wherein the corresponding metadata has a lowest comparison value.

14. The method of claim 11, further comprising receiving the at least one selection criteria from a user via a graphical user interface.

15. The method of claim 11, further comprising processing the stored data representing the samples of the received wireless signal to produce digital data communicated by the wireless signal.

16. The method of claim 11, further comprising:
time-stamping the data representing samples of the received wireless signal; and
storing the time stamps in the one or more memory devices, wherein identifying those portions of the stored data having the one or more signal properties of interest includes identifying the portions of the stored data using the time stamps.

17. The method of claim 11, further comprising displaying on a device the processed data arranged in order from those selected portions of the stored data wherein the corresponding metadata has a highest comparison value, to those selected portions of the stored data wherein the corresponding metadata has a lowest comparison value.

* * * * *